(12) United States Patent
Wakisaka et al.

(10) Patent No.: US 6,421,828 B1
(45) Date of Patent: Jul. 16, 2002

(54) PROGRAM GUIDE DISPLAY CONTROLLER AND TELEVISION RECEIVER

(75) Inventors: Masako Wakisaka, Osaka; Akihiko Yamashita, Kobe, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/180,842

(22) PCT Filed: May 26, 1997

(86) PCT No.: PCT/JP97/01777

§ 371 (c)(1),
(2), (4) Date: Nov. 19, 1998

(87) PCT Pub. No.: WO97/46011

PCT Pub. Date: Dec. 4, 1997

(30) Foreign Application Priority Data

May 31, 1996 (JP) .............................................. 8-138323

(51) Int. Cl.⁷ ............................................... H40N 5/445
(52) U.S. Cl. ........................... 725/52; 725/39; 345/720; 345/821; 345/822; 345/858
(58) Field of Search ........................ 348/906; 345/145, 345/146, 345, 327, 326, 339, 810–812, 856–858, 821, 822, 720, 721; 725/39, 52; 455/5.1

(56) References Cited

U.S. PATENT DOCUMENTS 5,589,892 A  * 12/1996  Knee et al. .................. 348/731
5,592,551 A  *  1/1997  Lett et al. ..................... 380/20
5,596,373 A  *  1/1997  White et al. ................. 348/906
5,677,708 A  * 10/1997  Matthews, III et al. ..... 348/906
5,699,107 A  * 12/1997  Lawler et al. ............... 348/906
5,710,605 A  *  1/1998  Nelson ........................ 348/906
5,734,853 A  *  3/1998  Hendricks et al. .......... 395/352
5,903,314 A  *  5/1999  Niijima et al. .............. 348/906
5,907,323 A  *  5/1999  Lawler et al. ............... 348/906
5,929,932 A  *  7/1999  Otsuki et al. ................ 348/906

FOREIGN PATENT DOCUMENTS

WO  WO 95 28799 A  10/1995

* cited by examiner

Primary Examiner—Andrew Faile
Assistant Examiner—Kieu-Oanh Bui
(74) Attorney, Agent, or Firm—Arent Fox Kintner Plotkin & Kahn

(57) ABSTRACT

A cursor can be moved quickly between program guides which are adapted to contents set by a user on a program guide screen. There are provided a display control unit for displaying a plurality of program guides in a matrix shape on a display device as well as displaying a cursor for designating a program using one of the vertical axis and the horizontal axis as a channel number axis and using the other axis as a time axis, to display a program guide of a program which is adapted to the contents set by a user and a program guide of a program which is not adapted to contents set by the user so as to be distinguishable, and a cursor control unit for moving, when a command to move a cursor rightward and leftward or upward and downward is entered, the cursor in the designated direction and to the program guide of the program which is adapted to the contents set by the user.

7 Claims, 13 Drawing Sheets

FIG. 2

| | So | | | | |
|---|---|---|---|---|---|
| (1, 0) | (1, 1) | (1, 2) | (1, 3) | (1, 4) | (1, 5) |
| (2, 0) | (2, 1) | (2, 2) | (2, 3) | (2, 4) | (2, 5) |
| (3, 0) | (3, 1) | (3, 2) | (3, 3) | (3, 4) | (3, 5) |
| (4, 0) | (4, 1) | (4, 2) | (4, 3) | (4, 4) | (4, 5) |
| (5, 0) | (5, 1) | (5, 2) | (5, 3) | (5, 4) | (5, 5) |

FIG. 4

| | 9:00 | 9:30 | 10:00 | 10:30 | 11:00 |
|---|---|---|---|---|---|
| CH. 2 | Nixon | | Forest Gump | | |
| CH. 4 | | | | | |
| CH. 6 | Sabrina | | | | |
| CH. 8 | | | | | |
| CH. 10 | | | | | |

FIG. 12

| CH31 | A |  |  | B |  |
|------|---|--|--|---|--|
| CH32 |  |  | C |  |  |
| CH33 | D |  |  |  | E |
| CH34 |  |  |  |  |  |
| CH35 |  |  |  |  |  |

FIG. 13

|  | 9:00 | 9:30 | 10:00 | 10:30 | 11:00 |
|--|------|------|-------|-------|-------|
| CH. 2 | Nixon || Forest Gump |||
| CH. 4 | *tennis* || *Baseball* |||
| CH. 6 | Sabrina |||||
| CH. 8 | *Golf* ||| *Boxing* ||
| CH. 10 | *CNN News* |||||

PROGRAM GUIDE DISPLAY CONTROLLER AND TELEVISION RECEIVER

BACKGROUND OF THE INVENTION

1. Field of the Invention

The present invention relates to a program guide display controller and a television receiver for displaying a program guide required to select a program desired by a user from a plurality of channels in television broadcasting.

2. Description of the Related Art

In DSS (Digital Satellite Broadcasting System) put to practical use in the United States, a lot of (150 or more) channels are prepared, and a large number of programs are presented. In this system, guide information of programs being currently broadcast and programs to be broadcast in the future, together with inherent program data, are transmitted at predetermined time intervals. A user terminal has the function of displaying a program guide screen (a program guide list) on the basis of the program guide information.

A program guide list e which is a part of the whole of a program guide list E corresponding to all of received program guide information is displayed as a program guide screen, as shown in FIG. 14, at the user terminal. A plurality of program guides are displayed in a matrix shape using the vertical axis as a channel number axis and using the horizontal axis as a time axis on the program guide screen. In this example, programs corresponding to five channels and corresponding to two and a half hours are displayed on the program guide screen. The numbers of the channels are displayed in longitudinal alignment in the left end of the program guide screen. In a row corresponding to each of the channels, frames indicating periods of time of the respective programs which are broadcast on the channel are displayed, and titles (A to P) are respectively displayed in the frames.

A cursor for designating the program and scrolling the program guide screen is displayed on the program guide screen. The cursor is moved by operating four cursor moving keys respectively provided every directions, i.e., leftward, rightward, upward and downward. The cursor is moved for each channel every time the cursor moving key for upward or downward movement is operated. On the other hand, the cursor is moved for each predetermined time every time the cursor moving key for rightward or leftward movement is operated.

Programs presented in the DSS include a free program which can be viewed without charge if a fee for using the system such as a fee for admission to the DSS and a basic fee is paid and a pay program for which a fee must be charged in addition to the fee for using the system. Examples of the pay program include one which is previously purchased for each channel and one for which a fee is charged only when it is viewed (PPV : pay per view).

A command to display the program guide screen, for example, is generally issued on a menu screen. A user can restrict a program guide which he or she desires to view by setting a category and the like on the menu screen. When such setting is performed, the program guide screen is displayed such that a program guide of a program which is adapted to contents set by the user and a program guide of a program which is not adapted to the contents set by the user can be distinguished.

For example, when the user sets a particular category, titles are respectively displayed only for programs belonging to the particular category set by the user on the program guide screen. FIG. 4 illustrates an example of the program guide screen in a case where the movie category is set.

When such a program guide screen is displayed, it is preferable that the cursor is moved as quickly as possible between program guides of programs belonging to the particular category set by the user.

An object of the present invention is to provide a program guide display controller and a television receiver so adapted that a cursor can be moved quickly between program guides of programs which are adapted to contents set by a user on a program guide screen.

SUMMARY OF THE INVENTION

The present invention is directed to a program guide display controller for displaying a plurality of program guides in a matrix shape on a display device as well as displaying a cursor for designating a program using one of the vertical axis and the horizontal axis as a channel number axis and using the other axis as a time axis, comprising display control means for displaying a program guide of a program which is adapted to contents set by a user and a program guide of a program which is not adapted to the contents set by the user so as to be distinguishable, and cursor control means for moving, when a command to move a cursor rightward and leftward or upward and downward is entered, the cursor in the designated direction and to the program guide of the program which is adapted to the contents set by the user.

According to another mode of the present invention, there is provided a program guide display controller comprising first cursor control means for moving, when a command to move a cursor rightward or leftward is entered, the cursor by a predetermined unit amount in the designated direction, and second cursor control means for moving, when a command to move a cursor upward or downward is entered, the cursor in the designated direction and to the program guide of the program which is adapted to the contents set by the user.

According to still another mode of the present invention, there is provided a program guide display controller comprising display control means for displaying a program guide of a program which is adapted to contents set by a user and a program guide of a program which is not adapted to the contents set by the user so as to be distinguishable, first cursor control means for moving, when a command to move a cursor rightward or leftward is entered, the cursor in the designated direction and to the program guide of the program which is adapted to the contents set by the user, and second cursor control means for moving, when a command to move a cursor upward or downward is entered, the cursor by a predetermined unit amount in the designated direction.

In each of the above-mentioned program guide controllers, the display control means displays, for the program which is adapted to the contents set by the user, the title of the program and does not display, for the program which is not adapted to the contents set by the user, the title of the program, to display the program guide of the program which is adapted to the contents set by the user and the program guide of the program which is not adapted to the contents set by the user so as to be distinguishable.

In each of the above-mentioned program guide display controllers, the display control means displays the title of the program which is adapted to the contents set by the user and the title of the program which is not adapted to the contents set by the user using different fonts, to display the program guide of the program which is adapted to the contents set by the user and the program guide of the program which is not adapted to the contents set so as to be distinguishable.

Furthermore, the above-mentioned program guide display controller is provided in a television receiver.

According to the present invention, the cursor can be moved quickly between the program guides of the programs which are adapted to the contents set by the user on the program guide screen.

BRIEF DESCRIPTION OF DRAWINGS

FIG. 2 is a schematic view showing a display table,

FIG. 4 is a schematic view showing an example of a program guide screen at the time of a restricted mode, FIG. 12 is an explanatory view for explaining the reason why a cursor is moved to a program guide of a program belonging to a category set by a user only in the case of one of upward and downward cursor movement and rightward and leftward cursor movement, FIG. 13 is a schematic view showing an example of a program guide screen on which the title of a program which belongs to a category set by a user and the title of a program which does not belong to the category set by the user are displayed using different fonts.

DETAILED DESCRIPTION OF THE INVENTION

Figure 1:
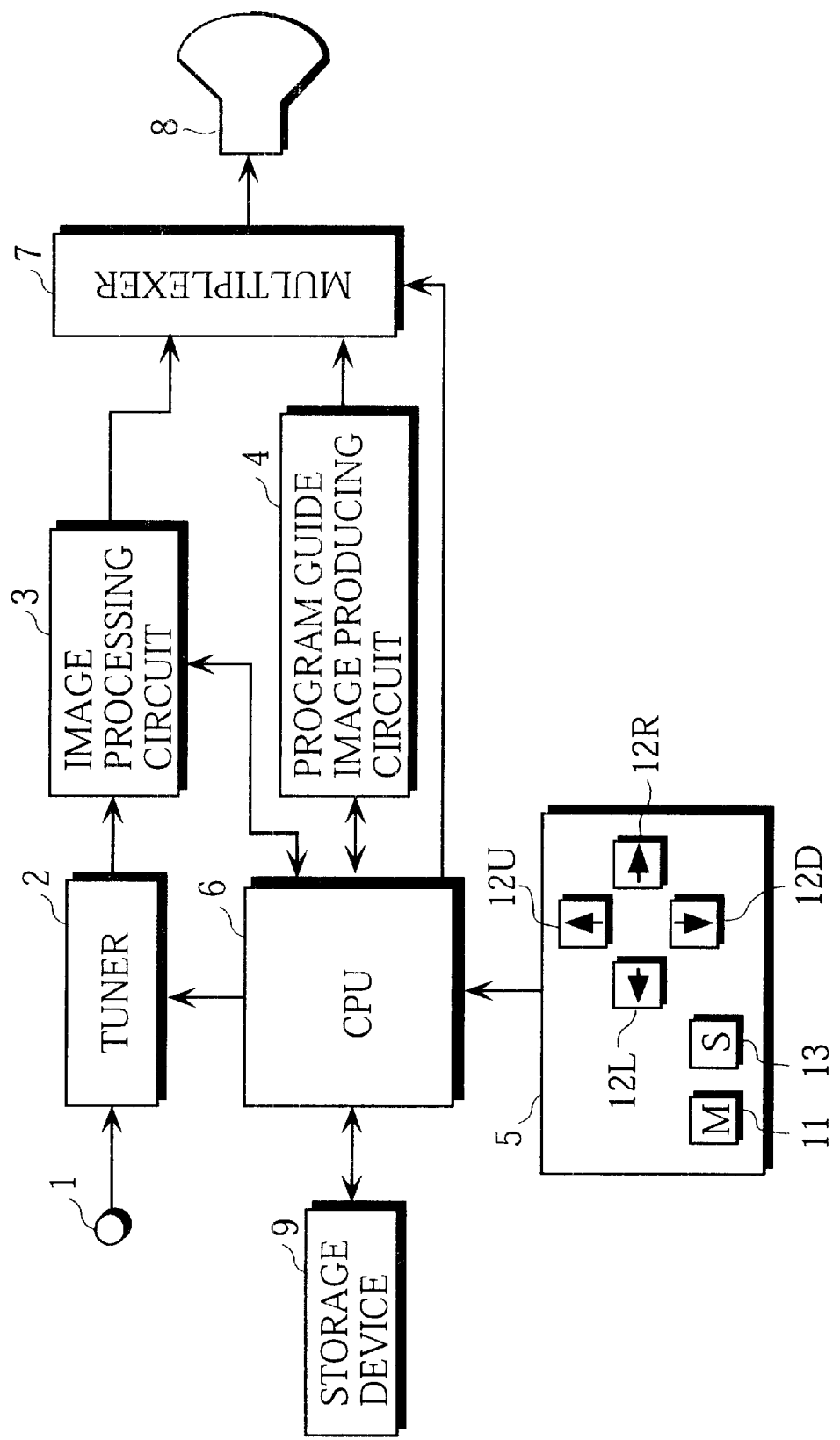
FIG. 1 is a block diagram showing the construction of a user terminal.

Referring now to the drawings, description is made of an embodiment in a case where the present invention is applied to DSS (Digital Satellite Broadcasting System) put to practical use in the United States.

[1] Description of Construction of User Terminal

FIG. 1 illustrates the construction of a user terminal.

Examples of the user terminal include a combination of a television receiver and a program guide display controller, or a television receiver in which a program guide display control circuit is incorporated. The user terminal comprises a CPU 6 for controlling the whole of the user terminal. The CPU 6 comprises a storage device 9 for storing its program and necessary data. An operating unit 5 composed of a remote controller and the like is connected to the CPU 6. The CPU 6 controls a tuner 2 in order to display a program selected by the operating unit 5, and controls a program guide image producing circuit 4 for producing a program guide image.

A high-frequency signal from a parabolic antenna (not shown) is inputted to an input terminal 1. The signal inputted to the input terminal 1 is sent to the tuner 2. In the tuner 2, processing such as frequency conversion and QPSK demodulation is performed, so that a stream of a digital image signal is produced. An output of the tuner 2 is sent to an image processing circuit 3.

In the image processing circuit 3, the stream outputted from the tuner 2 is MPEG-decoded, so that an analog image signal for display on a display device 8 such as a CRT, for example, an NTSC signal is generated. The image signal is sent to the display device 8 through a multiplexer 7, and is displayed on the display device 8.

Furthermore, the image processing circuit 3 extracts program guide information from the output of the tuner 2, and supplies the extracted program guide information to the CPU 6. The program guide information supplied to the CPU 6 is stored in the storage device 9. The storage device 9 further previously stores set screen information for displaying various set screens such as a menu screen, and stores information relating to purchased programs, for example.

The program guide image producing circuit 4 comprises a display memory (not shown). In the program guide image producing circuit 4, various set images and program guide images are produced on the display memory on the basis of the set screen information, the program guide information, and so forth which are stored in the storage device 9. Images produced on the display memory are sequentially read out, and are sent to the display device 8 through the multiplexer 7, so that the read images are displayed on the display device 8. The multiplexer 7 selects one of an output of the image processing circuit 3 and an output of the program guide image producing circuit 4 on the basis of a control signal from the CPU 6, and supplies the output to the display device 8.

The operating unit 5 is provided with a menu key 11 for displaying a menu screen, four cursor moving keys 12L, 12R, 12U, and 12D for moving the cursor rightward and leftward and upward and downward, a select key 13 for making selective entry, and so forth. The user may operate, when he or she desires to view a program guide screen, the menu key 11 to display the menu screen, and then operate the cursor moving keys 12L, 12R, 12U, and 12D and the select key 13 to select a program guide.

The user can restrict a program guide which he or she desires to view by setting a category and the like on the menu screen. When such setting is performed, the program guide screen is displayed such that a program guide of a program which is adapted to contents set by the user and a program guide of a program which is not adapted to the contents set by the user can be distinguished.

For example, when the user sets a particular category, a title is displayed only with respect to the program which belongs to the particular category set by the user on the program guide screen. FIG. 4 illustrates an example of the program guide screen in a case where the movie category is set.

In the following description, a display mode of the program guide screen in a case where a program guide desired to be viewed is not restricted is referred to as a normal mode, and a display mode of the program guide screen in a case where a program guide desired to be viewed is restricted is referred to as a restricted mode.

[2] Description of display processing of program guide screen at normal mode time Description is made of processing for displaying the program guide screen at the time of the normal mode. Program guide information sent to a receiver includes guide information of respective programs corresponding to all channels within 24 hours from the current time, for example. The program guide information of one program is constituted by the title, the fee (rating) in a case where the program is a PPV program, the category (sports, music, drama, news, etc.), the start and end time, and so forth.

Figure 14:
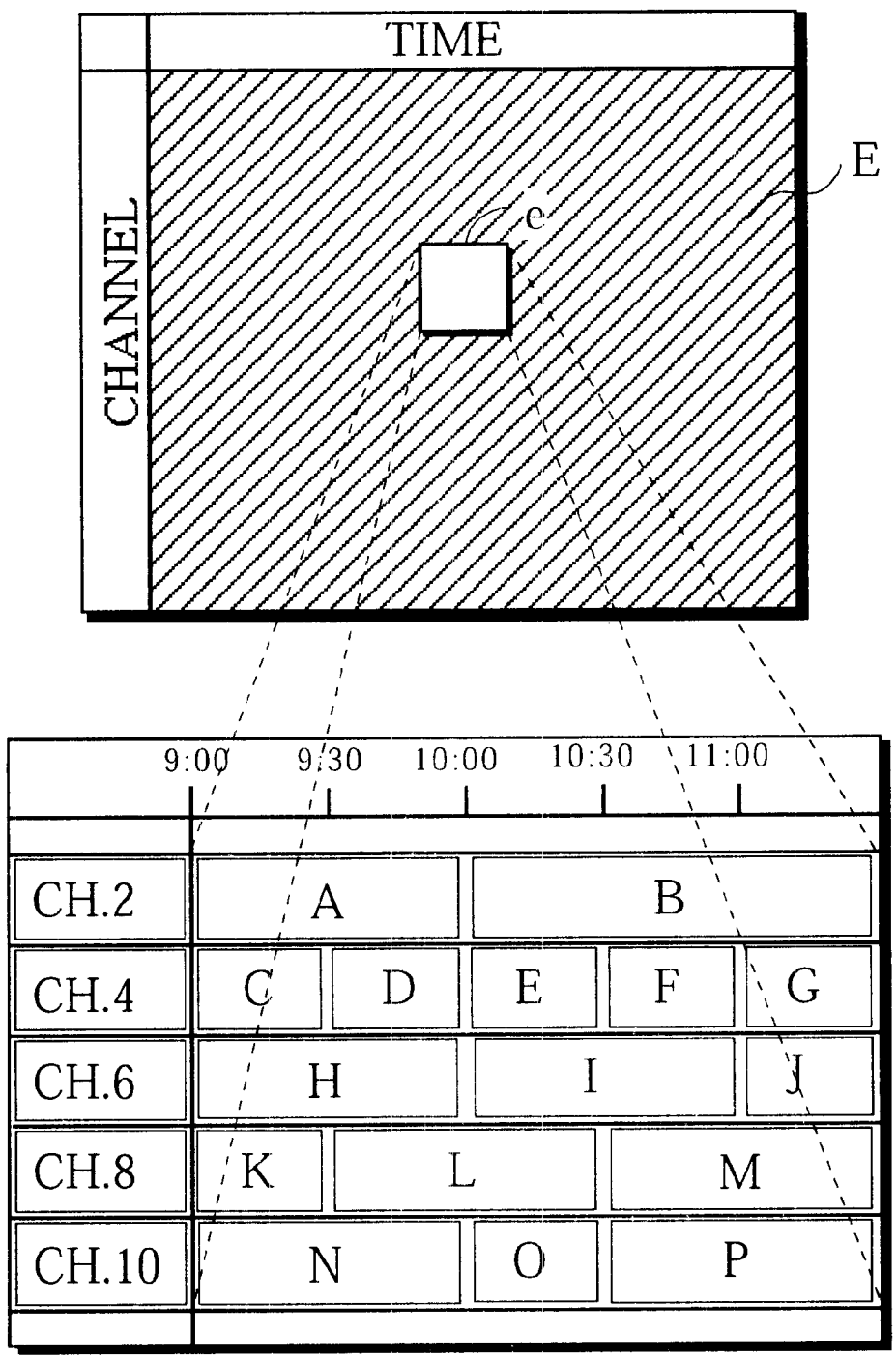
FIG. 14 is a schematic view showing a program guide screen displayed on a user terminal in DSS.

The CPU 6 takes the guide information of each of the programs corresponding to all the channels as information representing a two-dimensional arrangement using the vertical direction as a channel number and using the horizontal direction as time, as shown in the upper part of FIG. 14, to prepare an index table which can be accessed using a channel number and a slot number representing time. The slot number is a number assigned every 30 minutes, for example. An area E in the two-dimensional arrangement corresponding to all the program guide information shown in the upper part of FIG. 14 shall be referred to as an all-program guide area.

When program guide display is selected by the operating unit 5, the CPU 6 prepares a display table as shown in FIG. 2 on the basis of a channel number selected immediately before the program guide display is selected, the current time, and the index table. In FIG. 2, program guide display information is stored in each of small areas (hereinafter referred to as cells) in an area excluding the leftmost column. Consequently, a display table corresponding to program guides corresponding to 5 channels by 5 cells (corresponding to two and a half hours) is prepared in this example. A channel number (an absolute channel number) or data representing the name of a station corresponding to the channel number is stored in each of the cells in the leftmost column.

In FIG. 2, x in (x, y) described as an index for each cell represents a relative channel number (which is a relative channel number between the cells in the display table, and is not an absolute channel number), and y represents a relative slot number (which is a relative slot number between the cells in the display table, and is not an absolute slot number). The second cell So from the left in the uppermost row shall be referred to as a reference cell. At the time of the normal mode, program guide display information corresponding to a channel number selected immediately before the program guide display is selected and the current time is stored in the reference cell So.

The program guide display information stored in each of the cells comprises the title, the number of occupied cells, the rating, information indicating whether or not a program has been already purchased, the category, and so forth. The number of occupied cells is the number of cells from the cell to the cell in which the program is terminated. When the program is terminated in the cell, therefore, the number of occupied cells becomes one. The program guide image producing circuit 4 produces an image corresponding to a program guide screen as shown in the lower part of FIG. 14 on the display memory on the basis of the display table thus prepared. The image produced on the display memory is sent to the display device 8, so that the program guide screen as shown in the lower part of FIG. 14 is displayed on the display device 8.

Figure 3:
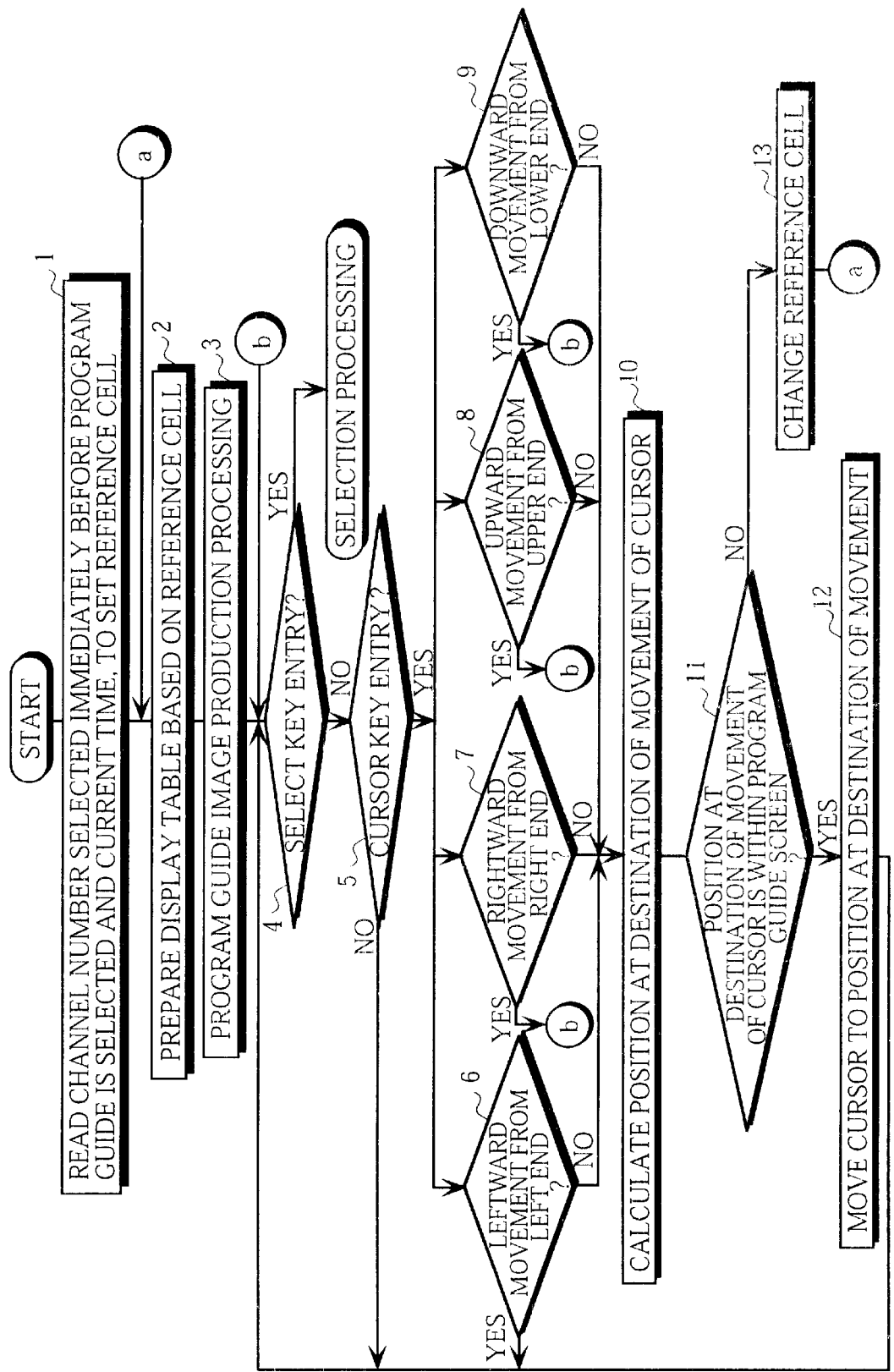
FIG. 3 is a flow chart showing the procedure for display processing of a program guide screen at the time of a normal mode.

FIG. 3 shows the procedure for display processing of a program guide screen which is performed by the CPU 6 and the program guide image producing circuit 4 at the time of the normal mode.

At the time of the normal mode, when a program guide is selected by the operating unit 5, a channel number selected immediately before the program guide is selected and the current time are read, so that a reference cell is set from the all-program guide area E (see FIG. 14) (step 1).

The display table shown in FIG. 2 is prepared on the basis of the set reference cell and the index table (step 2).

Information in the display table is sent to the program guide image producing circuit 4 from the CPU 6. In the program guide image producing circuit 4, program guide image production processing is performed on the basis of the sent information (step 3). That is, program guide images are produced on the display memory. The program guide images produced on the display memory are sequentially read out, and are sent to the display device 8, so that a program guide screen is displayed on the display device 8. Thereafter, a key entry waiting state occurs.

When select key entry is made by the select key 13 (YES at step 4), predetermined selection processing such as program selection or program reservation is performed.

When cursor key entry is made by the cursor moving keys 12L, 12R, 12U, and 12D (YES at step 5), processing at the step 6, 7, or 9 is performed in accordance with the operated cursor moving key 12L, 12R, 12U, or 12D.

Specifically, when the operated key is the leftward moving key 12L, the program proceeds to the step 6. At the step 6, it is judged whether or not a command to move leftward from the left end of the all-program guide area E is issued. When the operated key is the rightward moving key 12R, the program proceeds to the step 7. At the step 7, it is judged whether or not a command to move rightward from the right end of the all-program guide area E is issued. When the operated key is the upward moving key 12U, the program proceeds to the step 8. At the step 8, it is judged whether or not a command to move upward from the upper end of the all-program guide area E is issued. When the operated key is the downward moving key 12D, the program proceeds to the step 9. At the step 9, a command to move downward from the lower end of the all-program guide area E is issued.

In a case where the command to move leftward from the left end of the all-program guide area E is issued (YES at step 6), a case where the command to move rightward from the right end of the all-program guide area E is issued (YES at step 7), a case where the command to move upward from the upper end of the all-program guide area E is issued (YES at step 8), or a case where the command to move downward from the lower end of the all-program guide area E is issued (YES at step 9), that is, in a case where a command to move outward from the all-program guide area E is issued, the cursor cannot be moved, so that the program is returned to the step 4. At the step 4, a key entry waiting state occurs.

When the command to move the cursor by the cursor key entry is a command to move in the all-program guide area, a position at the destination of movement of the cursor is calculated (step 10). When the command to move the cursor is a command to move rightward and leftward, a position at the destination of movement of the cursor is calculated, taking the amount of movement as an amount corresponding to one cell (one slot) in the right-and-left direction. When the command to move the cursor is a command to move upward and downward, a position at the destination of movement of the cursor is calculated, taking the amount of movement as an amount corresponding to one cell (one slot) in the up-and-down direction. It is judged whether or not the position at the destination of movement of the cursor is within the program guide screen displayed on the display device 8 (step 11).

When the position at the destination of movement of the cursor is within the program guide screen displayed on the display device 8, a cursor image in the display memory is moved such that the cursor is displayed on the position at the destination of movement (step 12).

When the position at the destination of movement of the cursor is outside the program guide screen displayed on the display device 8, reference cell change processing is performed in order to change (scroll) the program guide screen (step 13). In the reference cell change processing, a position spaced by the amount of movement of the cursor in the direction in which the cursor is moved from the current reference cell in the all-program guide area E is taken as a new reference cell. When the new reference cell is set by the reference cell change processing, the program is returned to the step 2. Consequently, the display table shown in FIG. 2 is prepared on the basis of the reference cell newly set, so that a new program guide screen is displayed on the display device 8. That is, the program guide screen is updated.

[3] Description of display processing of program guide screen at restricted mode time.

Description is made of processing for displaying the program guide screen at the time of the restricted mode. Description is made by taking as an example a case where a particular category is set by a user, so that the program guide image as shown in FIG. 4 is displayed.

Figure 5:
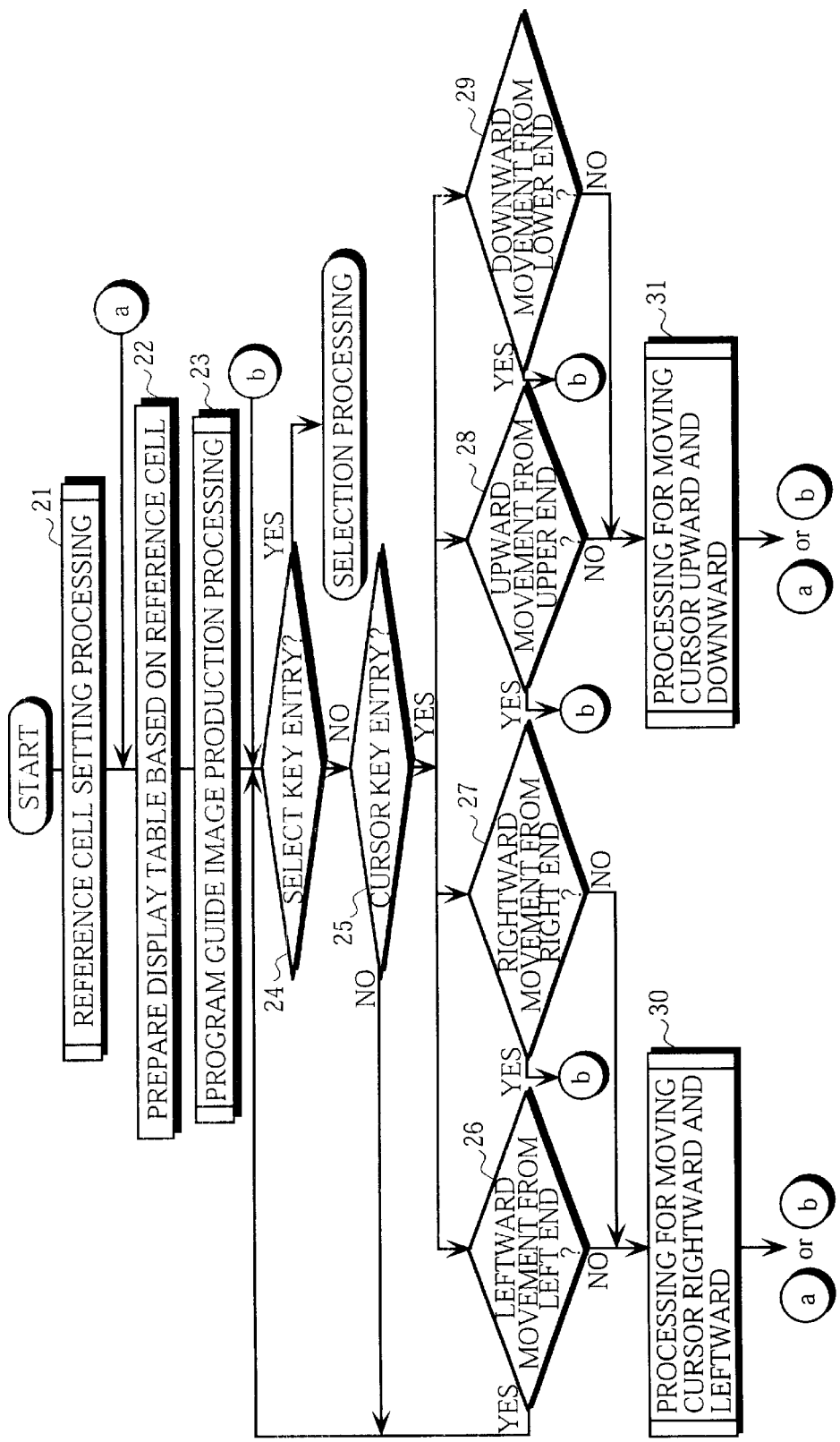
FIG. 5 is a flow chart showing the procedure for display processing of a program guide screen at the time of a restricted mode.

FIG. 5 shows the procedure for program guide screen display processing which is performed by the CPU 6 and the program guide image producing circuit 4 at the time of the restricted mode.

When a program guide is selected by the operating unit 5 at the time of the restricted mode, reference cell setting processing is performed (step 21). An area corresponding to a program which is broadcast in a period of time corresponding to the current time and belongs to a category set by the user in the all-program guide area E is set as a reference cell, unlike that at the time of the normal mode. The details of the processing will be described later.

When the reference cell is set, the display table (see FIG. 2) is prepared on the basis of the set reference cell and the index table, as that at the time of the normal mode (step 22).

Information in the display table is sent to the program guide image producing circuit 4 from the CPU 6. In the program guide image producing circuit 4, program guide image production processing is performed on the basis of the sent information (step 23). That is, program guide images are produced on the display memory. In this case, a title image of a program which does not belong to the category set by the user is not produced on the display memory. The program guide images produced on the display memory are sequentially read out, and are sent to the display device 8, so that a program guide screen is displayed on the display device 8. Thereafter, a key entry waiting state occurs. The details of the processing at the step 23 will be described later.

When select key entry is made by the select key 13 (YES at step 24), predetermined selection processing such as program selection or program reservation is performed.

When cursor key entry is made by the cursor moving keys 12L, 12R, 12U, and 12D (YES at step 25) processing at the step 26, 27, 28, or 29 is performed in accordance with the operated cursor moving key 12L, 12R, 12U, or 12D.

Specifically, when the operated key is the leftward moving key 12L, the program proceeds to the step 26. At the step 26, it is judged whether or not a command to move leftward from the left end of the all-program guide area E is issued. When the operated key is the rightward moving key 12R, the program proceeds to the step 27. At the step 27, it is judged whether or not a command to move rightward from the right end of the all-program guide area E is issued. When the operated key is the upward moving key 12U, the program proceeds to the step 28. At the step 28, it is judged whether or not a command to move upward from the upper end of the all-program guide area E is issued. When the operated key is the downward moving key 12D, the program proceeds to the step 29. At the step 29, it is judged whether or not a command to move downward from the lower end of the all-program guide area E is issued.

In a case where the command to move leftward from the left end of the all-program guide area E is issued (YES at step 26), a case where the command to move rightward from the right end of the all-program guide area E is issued (YES at step 27), a case where the command to move upward from the upper end of the all-program guide area E is issued (YES at step 28), or a case where the command to move downward from the lower end of the all-program guide area E (YES at step 29), that is, in a case where a command to move outward from the all-program guide area E, the cursor cannot be moved, so that the program is returned to the step 24. At the step 24, a key entry waiting state occurs.

When the operated key is the leftward moving key 12L or the rightward moving key 12R, and the command to move the cursor is a command to move in the all-program guide area E (NO at step 26 or 27), processing for moving the cursor rightward or leftward is performed (step 30). In the present embodiment, in the processing for moving the cursor rightward or leftward, the cursor is moved rightward or leftward by an amount corresponding to one cell. The details of the processing will be described later.

When the operated key is the upward moving key 12U or the downward moving key 12D, and the command to move the cursor is a command to move in the all-program guide area E (NO at step 28 or 29), processing for moving the cursor upward or downward is performed (step 31). In the present embodiment, in the processing for moving the cursor upward or downward, the cursor is moved upward or downward to a program guide belonging to the category set by the user. The details of the processing will be described later.

Figure 6:
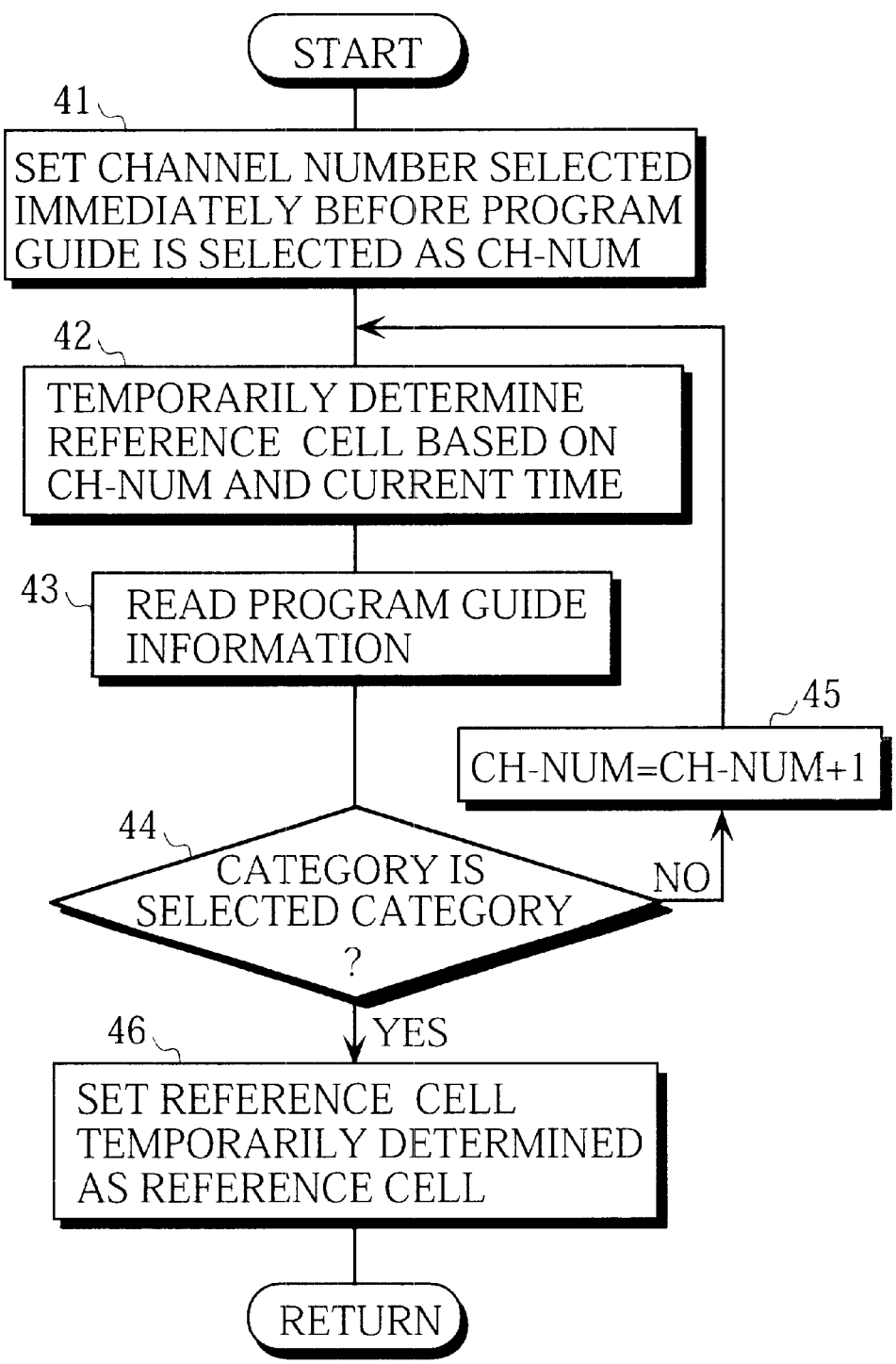
FIG. 6 is a flow chart showing the detailed procedure for setting processing of a reference cell at the step 21 shown in FIG. 5.

FIG. 6 illustrates the procedure for the reference cell setting processing at the step 21 shown in FIG. 5.

In the reference cell setting processing, a channel number selected immediately before the program guide is selected by the operating unit 5 is first set as a variable CH-NUM representing a channel number (step 41).

A reference cell is temporarily determined from the all-program guide area E on the basis of the channel number represented by the variable CH-NUM, the current time, and the index table (step 42).

Program guide information corresponding to the reference cell temporarily determined is read from the storage means 9 (step 43). It is judged whether or not the category of a program corresponding to the reference cell coincides with the category set by the user on the basis of the read program guide information (step 44).

When the category of the program corresponding to the reference cell differs from the category set by the user, the variable CH-NUM representing the channel number is incremented by one (step 45). That is, the value of the variable CH-NUM is updated. The program is then returned to the step 42. At the step 42, the reference cell is temporarily determined from the all-program guide area E on the basis of the channel number represented by the updated variable CH-NUM and the current time, so that the processing at the steps 43 and 44 is performed with respect to the cell temporarily determined.

When it is judged at the step 44 that the category of the program corresponding to the reference cell temporarily determined at the step 42 coincides with the category set by the user, the reference cell temporarily set is set as a formal reference cell (step 46). That is, an area corresponding to one program which is broadcast in a period of time corresponding to the current time and belongs to the category set by the user is set as a reference cell.

As a result of updating the variable CH-NUM at the step 45, when the value of the variable CH-NUM exceeds the maximum value of the channel number, a position corresponding to the channel number selected immediately before a command to display the program guide screen is issued and the current time is selected as a reference cell, as that at the time of the normal mode.

Figure 7:
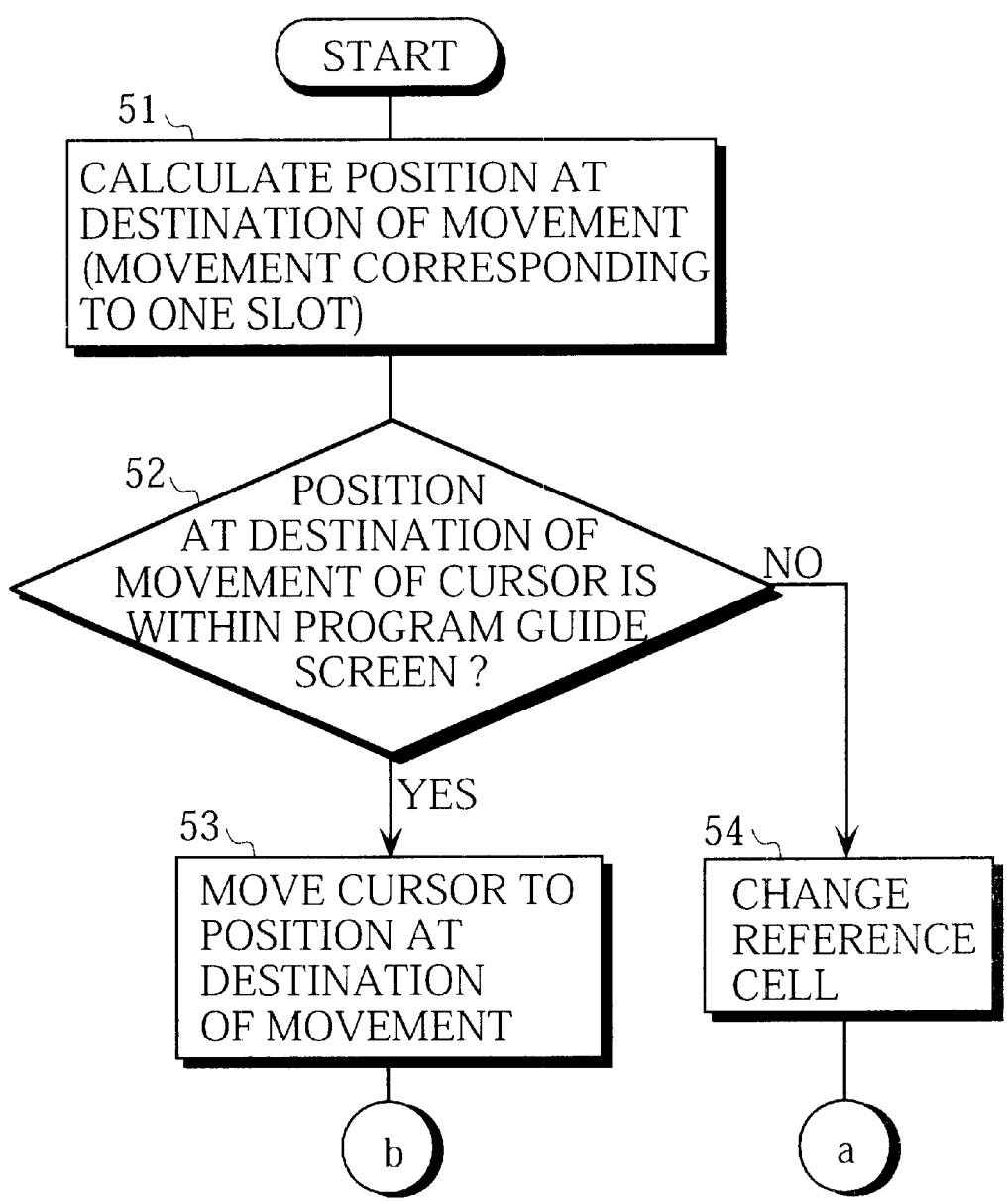
FIG. 7 is a flow chart showing the detailed procedure for rightward and leftward cursor control processing at the step 30 shown in FIG. 5.

FIG. 7 shows the procedure for processing for moving the cursor rightward and leftward at the step 30 shown in FIG. 5.

A position at the destination of movement of the cursor is first calculated, taking the amount of movement of the cursor as an amount corresponding to one cell (one slot) in the right-and-left direction (step 51). It is judged whether or not the position at the destination of movement of the cursor is within the program guide screen displayed on the display device 8 (step 52).

When the position at the destination of movement of the cursor is within the program guide screen displayed on the display device 8, a cursor image in the display memory is moved such that the cursor is displayed in the position at the destination of movement (step 53). The program is returned to the step 24 shown in FIG. 5. At the step 24, key entry is waited for.

When the position at the destination of movement of the cursor is outside the program guide screen displayed on the display device 8, reference cell change processing is performed in order to change (scroll) the program guide screen (step 54). In the reference cell change processing, a position spaced by the amount of movement of the cursor in the direction in which the cursor is moved from the current reference cell in the all-program guide area E is taken as a new reference cell. When the new reference cell is set by the reference cell change processing, the program is returned to the step 22 shown in FIG. 5. Consequently, the display table shown in FIG. 2 is prepared on the basis of the reference cell newly set, so that a new program guide e screen is displayed on the display de vice 8. That is, the program guide screen is updated.

Figure 8:
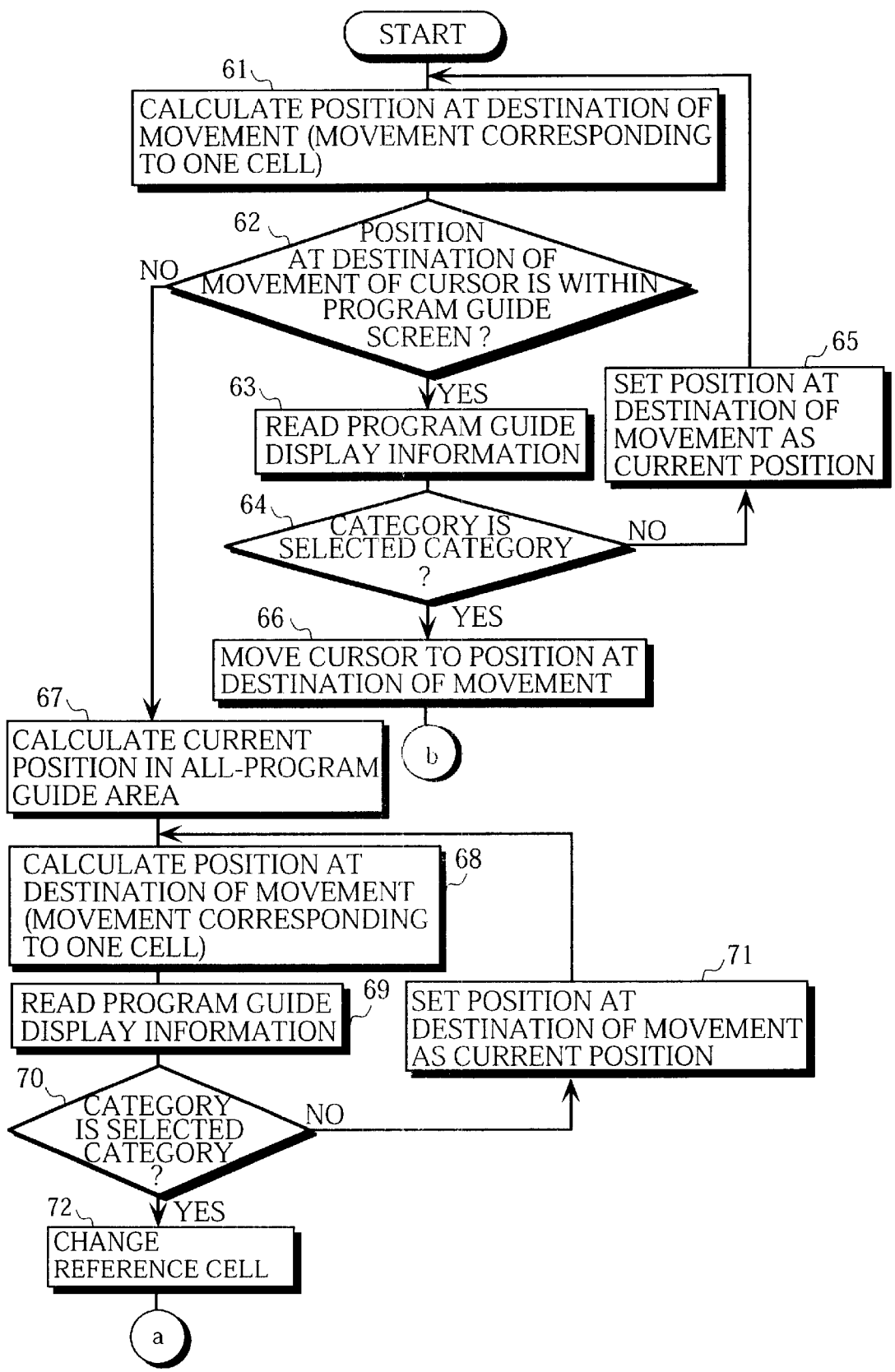
FIG. 8 is a flow chart showing the detailed procedure for upward and downward cursor control processing at the step 31 shown in FIG. 5.

FIG. 8 shows the procedure for moving the cursor upward and downward at the step 31 shown in FIG. 5.

A position at the destination of movement of the cursor is first calculated, taking the amount of movement of the cursor from the current position as an amount corresponding to one cell (one channel) in the up-and-down direction (step 61). It is judged whether or not the position at the destination of the cursor is within the program guide screen displayed on the display device 8 (step 62).

When the position at the destination of movement of the cursor is within the program guide screen displayed on the display device 8, program guide, display information is read from a cell corresponding to the position at the destination of movement of the cursor (step 63). It is judged whether or not the category of a program corresponding to the cell at the destination of movement of the cursor coincides with the category set by the user on the basis of the read program guide display information (step 64).

When the category of the program corresponding to the cell at the destination of movement of the cursor differs from the category set by the user, the position at the destination of movement of the cursor is set as the current position (step 65). Thereafter, the program is returned to the step 61. At the step 61, a position at the destination of movement of the cursor corresponding to the current position newly set is calculated. Processing at the step 62 and the subsequent steps is performed on the basis of the calculated position at the destination of movement of the cursor.

When it is judged at the foregoing step 64 that the category of the program corresponding to the cell at the destination of movement of the cursor coincides with the category set by the user, a cursor image in a display memory is moved such that the cursor is displayed on the position at the destination of movement (step 66). That is, the cursor is moved to a program guide of a program belonging to the category set by the user by operating the cursor moving key 12U or 12D once. Thereafter, the program is returned to the step 24 shown in FIG. 5. At the step 24, key entry is waited for.

When it is judged at the foregoing step 62 that the position at the destination of movement of the cursor which is calculated at the step 61 is outside the program guide screen displayed on the display device 8, the current position of the cursor in the all-program guide area E is calculated (step 67). The position at the destination of movement of the cursor in the all-program guide area E is calculated, taking the amount of movement of the cursor from the current position as an amount corresponding to one channel (step 68).

Program guide information corresponding to the position at the destination of movement of the cursor is read on the basis of the index table (step 69). It is judged whether or not the category of a program corresponding to the position at the destination of movement of the cursor coincides with the category set by the user on the basis of the read program guide information (step 70).

When the category of the program corresponding to the position at the destination of movement of the cursor differs from the category set by the user, the position at the destination of movement of the cursor is set as the current position (step 71). Thereafter, the program is returned to the step 68. At the step 68, a position at the destination of movement of the cursor corresponding to the current position newly set is calculated. Processing at the step 69 and the subsequent steps is performed on the basis of the calculated position at the destination of movement of the cursor.

When it is judged at the foregoing step 70 that the category of the program corresponding to the position at the destination of movement of the cursor coincides with the category set by the user, reference cell change processing is performed in order to change (scroll) the program guide screen (step 72). In the reference cell change processing, an area, in the all-program guide area E, where the channel number is a channel number corresponding to the position at the destination of movement of the cursor, and the slot number is a slot number of the reference cell on the program guide screen currently displayed is taken as a reference cell.

Figure 11:
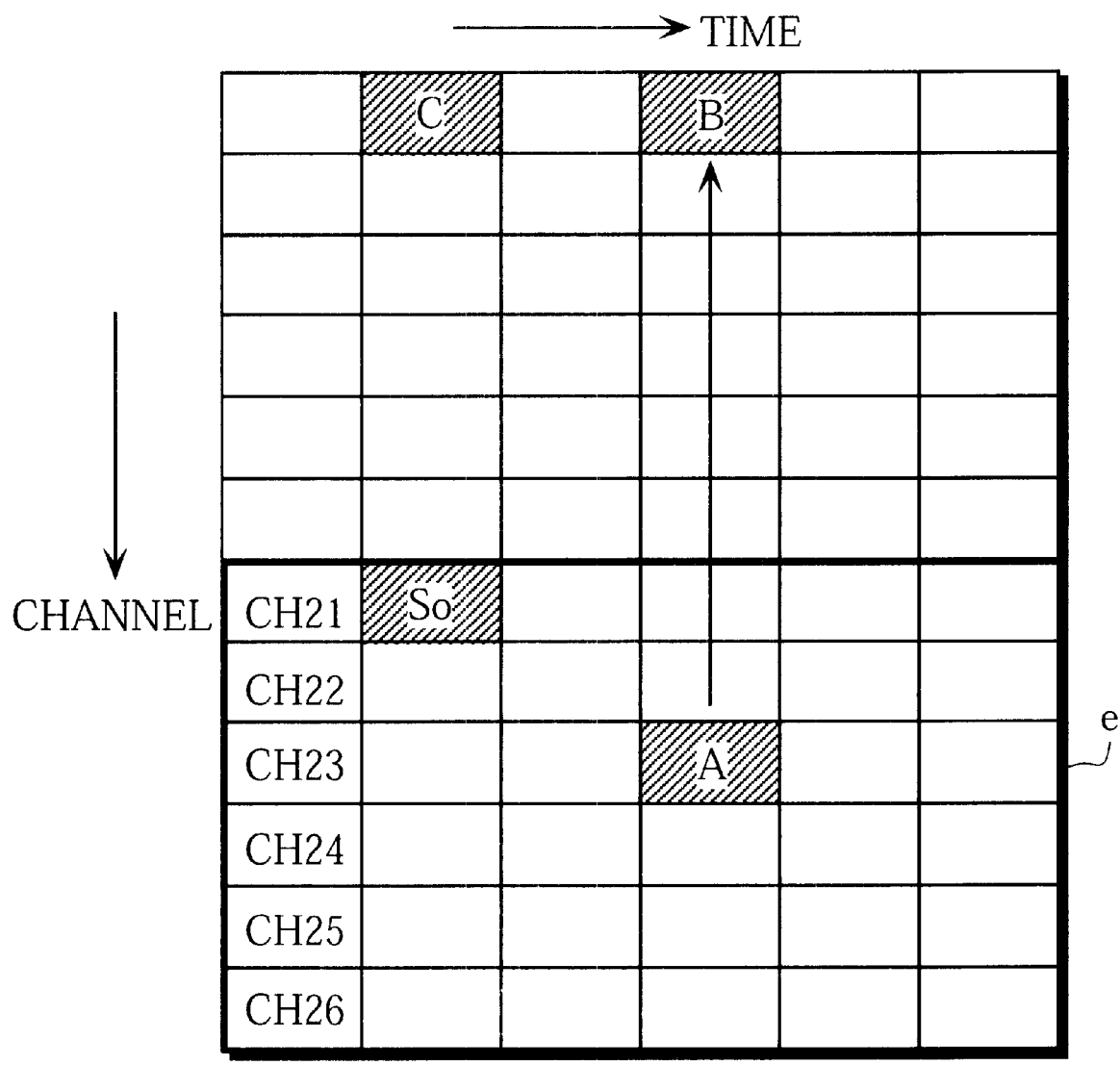
FIG. 11 is an explanatory view for explaining reference cell change processing at the step 72 shown in FIG. 8.

In a case where the upward moving key 12U is operated when the cursor is on a program guide A in a program guide screen e, as shown in FIG. 11, therefore, a position at the destination of movement of the cursor is a position B outside the program guide screen e, so that the reference cell is changed into a cell corresponding to a position c from the current reference cell So.

When a new reference cell is set by the reference cell change processing, the program is returned to the step 22 shown in FIG. 5. Consequently, the display table shown in FIG. 2 is prepared on the basis of the reference cell newly set, so that a new program guide screen is displayed on the display device 8. That is, the program guide screen is updated. As a result, the cursor is moved to a program guide of a program belonging to the category set by the user.

Figure 9:
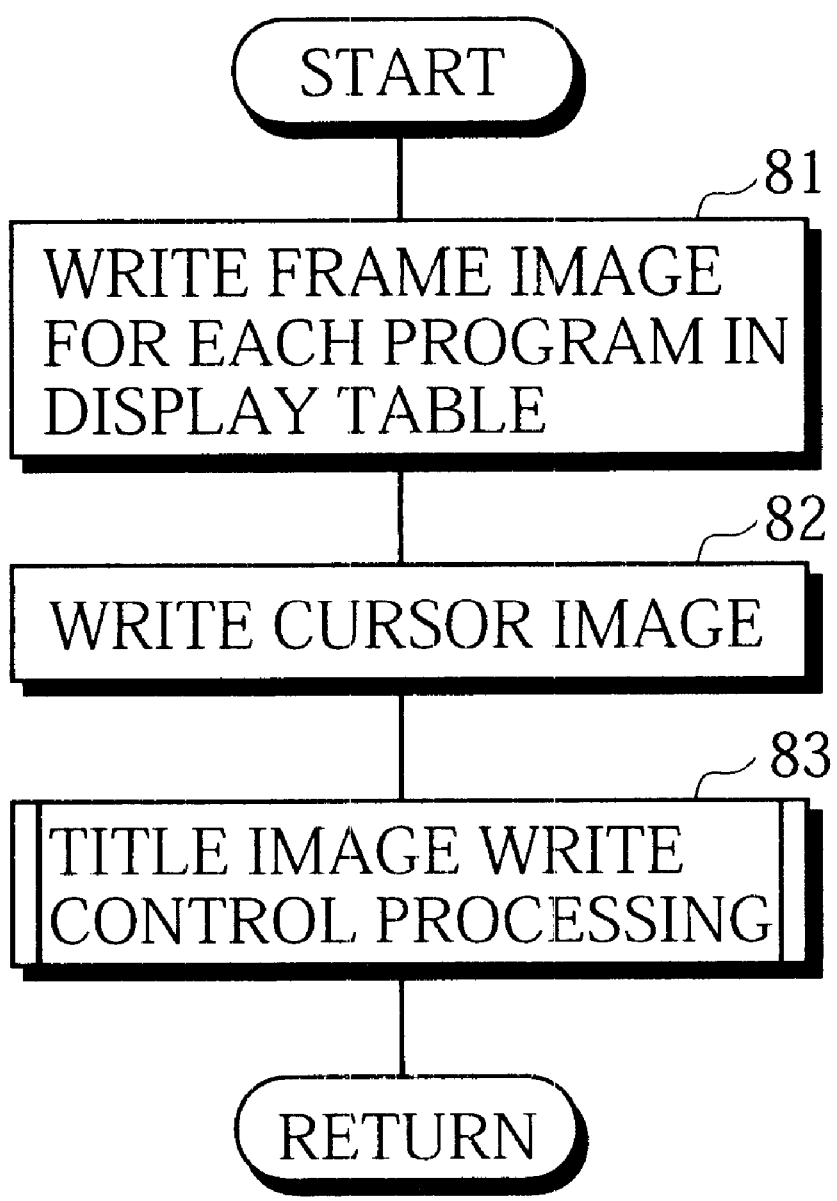
FIG. 9 is a flow chart showing the detailed procedure for program guide image production processing at the step 23 shown in FIG. 5.

FIG. 9 shows the detailed procedure for the program guide image production processing at the step 23 shown in FIG. 5.

For each of programs in the display table, a frame image of a size corresponding to a period of time occupied by the program is written into the display memory on the basis of the number of occupied cells (step 81). A cursor image is then written into the display memory (step 82). Thereafter, write control processing of an image representing a title (a title image) is performed (step 83).

Figure 10:
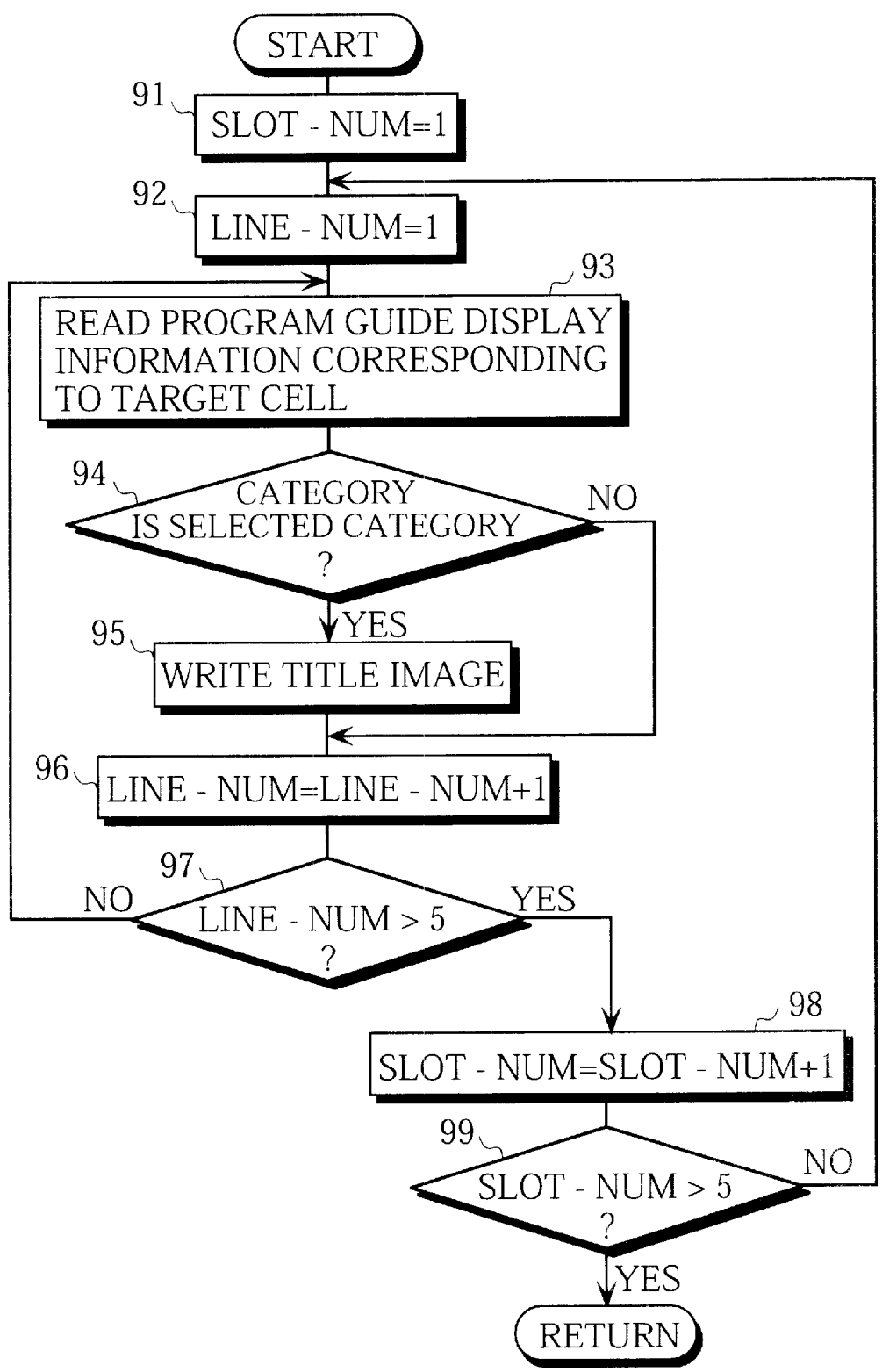
FIG. 10 is a flow chart showing the detailed procedure for title image write control processing at the step 83 shown in FIG. 9.

FIG. 10 shows the procedure for the write control processing of the title image at the step 83 shown in FIG. 9.

One is first set in a variable SLOT-NUM representing a relative slot number (step 91). Further, one is set in a variable LINE-NUM representing a relative channel number (step 92).

A cell specified by the variable SLOT-NUM and the variable LINE-NUM is taken as a target cell, and program guide display information corresponding to the target cell is read from the display table (step 93). It is judged whether or not the category of a program corresponding to the target cell coincides with the category set by the user on the basis of the read program guide display information (step 94).

When it is judged that the category of the program corresponding to the target cell coincides with the category set by the user, a title image of a program corresponding to the cell is written into the display memory (step 95). The program proceeds to the step 96.

When it is judged that the category of the program corresponding to the target cell differs from the category set by the user, the program proceeds to the step 96 without writing the title image of the program corresponding to the cell.

At the step 96, the variable LINE-NUM representing the relative channel number is incremented by one. That is, the variable LINE-NUM is updated. It is judged whether or not the updated variable LINE-NUM is more than five (step 97). When the updated variable LINE-NUM is not more than five (NO at step 97), the program is returned to the step 93. At the step 93, the processing at the steps 93 to 97 is performed again with respect to a cell specified by the updated variable LINE-NUM and the variable SLOT-NUM currently set.

When the processing at the steps 93 to 97 is thus performed with respect to five cells specified by one relative slot number SLOT-NUM and first to fifth relative channel numbers LINE-NUM, the answer is in the affirmative at the step 97, after which the program proceeds to the step 98.

At the step 98, the variable SLOT-NUM representing the relative slot number is incremented by one. That is, the variable SLOT-NUM is updated. It is judged whether or not the updated variable SLOT-NUM is more than five (step 99). When the updated variable SLOT-NUM is not more than five (NO at step 99), the program is returned to the step 92. At the step 92, the processing at the steps 92 to 97 is performed again using the updated variable SLOT-NUM.

When the processing at the steps 93 to 99 is thus performed with respect to 25 cells specified by first to fifth relative slot numbers SLOT-NUM and first to fifth relative channel numbers LINE-NUM, that is, all cells excluding cells at the left end in the display table, the answer is in the affirmative at the step 99, so that the write control processing of the title image is terminated.

In the above-mentioned present embodiment, in the processing for moving the cursor rightward and leftward (step 30 in FIG. 5), the cursor is moved by an amount corresponding to one cell rightward or leftward. In the processing for moving the cursor upward and downward (step 31 in FIG. 5), the cursor is moved upward or downward to a program guide of the program belonging to the category set by the user. However, the cursor may be moved rightward or leftward to the program guide of the program belonging to the category set by the user in the processing for moving the cursor rightward and leftward, and moved by an amount corresponding to one cell upward or downward in the processing for moving the cursor upward and downward.

The reason why the cursor is moved to the program guide of the program belonging to the category set by the user only when the cursor is moved either upward and downward or rightward and leftward is as follows. Suppose a case where the program guide of the program belonging to the category set by the user is arranged, as shown in FIG. 12, on the program guide screen. In FIG. 12, A, B, C, D, and E are program guides of programs belonging to the category set by the user. Assuming that the cursor is moved to the program guide of the program belonging to the category set by the user in both a case where the cursor is moved upward and downward and a case where the cursor is moved rightward and leftward, the cursor cannot be moved from the program guide A to the program guide C.

Contrary to this, in a method of moving the cursor by an amount corresponding to one cell rightward and leftward when the cursor is moved rightward and leftward and moving the cursor to the program guide of the program belonging to the category set by the user when the cursor is moved upward and downward, the cursor may be first moved to the same slot number as that of the program guide C by moving the cursor rightward, and then moved downward.

In a method of moving the cursor to the program guide of the program belonging to the category set by the user when the cursor is moved rightward and leftward and moving the cursor by an amount corresponding to one cell upward or downward when the cursor is moved upward and downward, the cursor may be first moved to the same channel number as that of the program guide C by downward movement, and then moved rightward.

Although in the above-mentioned present embodiment, a blank program guide is also displayed with respect to a channel including no programs belonging to the category set by the user at the time of the restricted mode, the program guide may not be displayed with respect to the channel including no programs belonging to the category set by the user at the time of the restricted mode.

Specifically, only program guide information of each of programs corresponding to a channel including at least one program belonging to the category set by the user is extracted, to prepare a table composed of only the program guide information of the program corresponding to the channel including at least one program belonging to the category set by the user. On the basis of the table, the reference cell is set, and the display table is prepared. In this case, therefore, the all-program guide area is an area defined by the program guide information of each of programs corresponding to the channel including at least one program belonging to the category set by the user.

In setting the reference cell, an area corresponding to a program which is broadcast in a period of time corresponding to the current time and a channel number closest to a channel number selected immediately before the program guide is selected in the area defined by the program guide information of each of programs corresponding to the channel including at least one program which belongs to the category set by the user is set as the reference cell. In this case, therefore, the setting of an area corresponding to a program which does not belong to the category set by the user as a reference cell may, in some cases, be performed, unlike the setting of the reference cell described in FIG. 6. When there exists no channel including at least one program belonging to the category set by the user, the fact may be displayed, to notify the user that the setting of the category is useless.

Although in the above-mentioned embodiment, the cursor is moved to the program guide of the program belonging to the category set by the user when the cursor is moved either upward and downward or rightward and leftward, the cursor may be moved to the program guide of the program belonging to the category set by the user only when the cursor is moved both upward and downward and rightward and leftward. In the case, when the cursor is moved from the program guide A to the program guide C as described in FIG. 12, the cursor may be moved to the program guide B in the vicinity of a program guide to be a target (to be selected) and then moved one cell at a time after being switched to a state in a normal mode, to select the program guide C to be a target.

Although in the above-mentioned embodiment, when a category is set by the user, only the title of a program which belongs to the category set by the user is displayed, and the title of a program which does not belong to the category set by the user is not displayed, the title of the program which belongs to the category set by the user and the title of the program which does not belong to the category set by the user may be displayed using different fonts. The present invention is also applicable to such a case.

According to the present invention, on the program guide screen, the cursor can be quickly moved between the program guides of the programs which are adapted to the contents set by the user.

Industrial Applicability

The present invention is suitably carried out for a program guide display controller in a television receiver or the like.

What is claimed is:

1. A program guide display controller for displaying a plurality of available program guides in a matrix shape on a display device as well as displaying a cursor for designating a program using a channel number axis and a time axis, comprising:

display control means for distinguishing the display of program guides of programs which correspond to a content selection set by a user from program guides of programs which do not correspond to the content selection set by the user; and cursor control means for moving, when a single command to move a cursor is entered, the cursor in the designated direction until the cursor reaches a program guide of a program which corresponds to the content selection set by the user, whereby the cursor moving means skips over any program guide whose content does not correspond to the content selection set by the user when the single command to move the cursor is entered.

2. A program guide display controller for displaying a plurality of available program guides in a matrix shape on a display device as well as displaying a cursor for designating a program using a channel number axis and a time axis, comprising:

display control means for distinguishing the display of program guides of programs which correspond to a content selection set by a user from program guides of programs which do not correspond to the content selection set by the user;

first cursor control means for moving, when a single command to move a cursor rightward or leftward is entered, the cursor by a predetermined unit amount in the designated direction; and second cursor control means for moving, when a single command to move a cursor upward or downward is entered, the cursor in the designated direction until the cursor reaches a program guide of a program which corresponds to the content selection set by the user, whereby the second cursor moving means skips over any program guide whose content does not correspond to the content selection set by the user when the second curser control means moves the cursor.

3. A program guide display controller for displaying a plurality of available program guides in a matrix shape on a display device as well as displaying a cursor for designating a program using a channel number axis and a time axis, comprising:

display control means for distinguishing the display of program guides of programs which correspond to a content selection set by a user from program guides of programs which do not correspond to the content selection set by the user;

first cursor control means for moving, when a single command to move a cursor rightward or leftward is entered, the cursor in the designated direction until the cursor reaches a program guide of a program which corresponds to the content selection set by the user, whereby the first cursor moving means skips over any program guide whose content does not correspond to the content selection set by the user when the first cursor control means moves the cursor; and second cursor control means for moving, when a single command to move a cursor upward or downward is entered, the cursor by a predetermined unit amount in the designated direction.

4. The program guide display controller according to any one of claims 1, 2, or 3, wherein the display control means displays, for the program which corresponds to the content selection set by the user, the title of the program and does not display, for the program which does not correspond to the content selection set by the user, the title of the program, in order to distinguish the program guides of programs which correspond to the content selection set by the user from the program guides of the programs which do not correspond to the content selection set by the user.

5. The program guide display controller according to any one of claims 1, 2, or 3, wherein the display control means displays the title of the program which corresponds to the content selection set by the user and the title of the program which does not correspond to the content selection set by the user using different fonts, in order to distinguish the program guides of programs which correspond to the content selection set by the user from the program guides of the programs which do not correspond to the content selection set by the user.

6. A television receiver comprising the program guide display controller according to any one of claims 1, 2 or 3.

7. A program guide display controller for displaying a plurality of program guides in a matrix shape on a display device as well as displaying a cursor for designating a program using a channel number axis and a time axis, comprising:

display control means for displaying available program guides and for distinguishing the display of program guides of programs which correspond to a content selection set by a user from program guides of programs which do not correspond to the content selection set by the user; and cursor control means for moving, when a single command to move a cursor is entered, the cursor in the designated direction until the cursor reaches a program guide of a program which corresponds to the content selection set by the user.

* * * * *